United States Patent [19]

Svarovsky et al.

[11] Patent Number: 5,659,231

[45] Date of Patent: Aug. 19, 1997

[54] BRAKE FOR DC BRUSHLESS MOTOR

[75] Inventors: James E. Svarovsky; Brian R. Campbell, both of Sagamore Hills, Ohio

[73] Assignee: Allen-Bradley Company, Inc., Milwaukee, Wis.

[21] Appl. No.: 315,649

[22] Filed: Sep. 30, 1994

[51] Int. Cl.$^6$ .................................................. H02K 7/10
[52] U.S. Cl. ........................ 318/368; 318/254; 318/138; 318/439; 388/928.1
[58] Field of Search .................. 318/368, 362, 318/364, 254, 138, 439, 757, 139, 609, 798–815; 388/928.1

[56] References Cited

U.S. PATENT DOCUMENTS

| | | |
|---|---|---|
| 3,596,160 | 7/1971 | Rakes . |
| 3,628,110 | 12/1971 | Casaday . |
| 3,629,675 | 12/1971 | Porath . |
| 3,633,084 | 1/1972 | Rakes . |
| 3,678,358 | 7/1972 | Kolatorowicz . |
| 3,854,077 | 12/1974 | Greenwell . |
| 4,255,695 | 3/1981 | Plunkett et al. ............... 318/800 X |
| 4,278,921 | 7/1981 | Medding et al. . |
| 4,366,427 | 12/1982 | Walker et al. ................. 318/757 X |
| 4,386,298 | 5/1983 | Toshimitu . |
| 4,426,606 | 1/1984 | Suita et al. . |
| 4,528,486 | 7/1985 | Flaig et al. ......................... 318/254 |
| 4,636,936 | 1/1987 | Boyd, Jr. et al. . |
| 4,686,437 | 8/1987 | Langley et al. .................... 318/254 |
| 4,693,595 | 9/1987 | Kunikawa et al. . |
| 4,710,684 | 12/1987 | Okita et al. . |
| 4,839,754 | 6/1989 | Gami et al. . |
| 5,227,702 | 7/1993 | Nahirney . |
| 5,311,069 | 5/1994 | Austin . |
| 5,430,362 | 7/1995 | Carr et al. ..................... 318/139 X |

*Primary Examiner*—Karen Masih
*Attorney, Agent, or Firm*—Keith M. Baxter; John M. Miller; John J. Horn

[57] ABSTRACT

The present invention provides for electronic braking of DC brushless motors by developing a feedback signal based on the back EMF of the motor. This feedback signal is used to provide a signal to the motor permitting current flow from the motor into the controller of a controlled level to slow the motor down. Reliance on the back EMF of the motor eliminates the need for a commutation signal when an emergency stop is required.

11 Claims, 1 Drawing Sheet

BRAKE FOR DC BRUSHLESS MOTOR

FIELD OF THE INVENTION

The present invention relates to apparatus for controlling DC brushless motors and more specifically to electronic circuits that provide for electronic braking of such motors.

BACKGROUND OF THE INVENTION

DC brushless motors are synchronous machines having a permanently magnetized rotor free to rotate within fixed stator coils. Phased alternating currents passing through the stator coils generate a magnetic field that rotates the rotor.

The phasing of the stator current with respect to the rotor position is provided by means of one or more rotor position sensing elements such as Hall effect or photoelectric devices that, by tracking a magnet or rotating opaque vane attached to the rotor, provide a "commutation" signal indicating rotor position. The commutation signal is used to control multiple solid state devices arranged in a bridge configuration to switch on and off a DC voltage so as to produce an AC driving voltage needed to apply the proper polarity of current to stator windings. The solid state switches may form a pulse-width modulated (PWM) inverter providing arbitrarily precise approximations of the needed AC driving voltages. For DC brushless motors that have multiple stator coils, multiple AC driving waveforms of different phases may be developed by multiple PWM inverters.

It is well known to control a brushless DC motor by means of one or more feedback loops. For example, in a torque control, the amplitude of the voltages applied to the motor terminals is adjusted to provide a predetermined amount of motor current, the latter which approximates motor torque. A torque command is compared to the motor torque represented by the motor current and the difference or error between these values is used to adjust the voltage applied to the motor.

It may be necessary to rapidly stop a rotating DC brushless motor in response to an emergency stop command. Such rapid stopping requires that the kinetic energy of the rotating motor shaft be quickly dissipated. The simplest method is a mechanical brake in which friction, such as between brake pads and a rotating surface, dissipates the kinetic energy as heat.

Dynamic braking makes use of the fact that the coasting DC motor acts like an electrical generator. In dynamic braking, a resistance is shunted across the stator windings allowing the energy of the coasting rotor to be converted to electrical energy and dissipated within the resistance as heat. In contrast, it should be noted that disconnecting the brushless DC motor from the source of power, insofar as it prevents current flow, eliminating the possibility of dissipating the rotors energy electrically because energy transfer out of the motor requires current flow.

While dynamic braking is relatively simple, it requires additional switching circuits and shunting resistors. Further, the effectiveness of such dynamic braking decreases rapidly as the motor speed drops thus causing an undesirably slow decay to zero RPM.

Another type of braking known in the art uses the commutating signal to create a "reverse" current in the stator windings thus creating a counter rotating magnetic field putting a reverse torque on the rotor. Such a reverse current system requires additional rephasing circuitry and relies on the availability of the commutation signal. Yet it is possible that in an emergency stop situation that commutation information will have been lost.

Accordingly, it would be desirable to have a means of braking brushless DC motors rapidly without complex circuitry or the need for commutation information.

SUMMARY OF THE INVENTION

The present invention provides a braking means for brushless DC motors that employs the motor's naturally occurring back EMF in conjunction with current feedback normally present for torque control to generate a braking signal. Because the braking signal is moderated in phase and amplitude by the back EMF of the coasting motor, the braking signal is automatically adjusted as the motor slows. Further, the braking signal may be developed even if the commutation or shaft position information is lost.

Specifically, the invention provides a method of braking the rotation of a brushless DC motor attached to a controller that provides a drive voltage across terminals of the motor in response to an error signal developed as the difference between a torque command signal and a current feedback signal. The invention includes the steps of setting the torque command to zero, detecting the back EMF of the motor, and generating a new error signal based on the back EMF of the motor and permitting the current to flow between the controller and the motor to dissipate motor energy.

Thus, it is one object of the invention to develop a braking signal that may be applied to the motor without the need for complex additional circuitry or commutation information. In situations where the controller is implemented largely in software, the invention requires no hardware changes because the back EMF may be detected in the signal developed by the software and used to drive the PWM inverter connected to the motor.

When the commutation signal is available, or another speed signal is available, the invention may include the additional step of disconnecting the drive circuitry from the motor when the motor speed drops below a certain point. Alternatively, the drive circuitry may be disconnected after a fixed time delay after the braking signal eliminating the need for a speed signal.

Thus, it is another object of the invention to permit the disconnection of power to the motor in an emergency stop situation after motor speed has dropped sufficiently that it may be dissipated solely through collateral mechanical means.

The error signal may be a combination of current feedback from the motor and back EMF feedback from the motor. The portion of the error signal generated by the back EMF may be limited in magnitude to limit the maximum current flowing between the motor and the controlling circuit.

Thus, it is another object of the invention to provide a braking method for a DC brushless motor wherein the energy dissipated within the controller circuit may be limited so as to permit the maximum braking effort without damage to the controller circuit.

The foregoing and other objects and advantages of the invention will appear from the following description. In the description, reference is made to the accompanying drawings which form a part hereof and in which there is shown by way of illustration, a preferred embodiment of the invention. Such embodiment does not necessarily represent the full scope of the invention, however, and reference must be made therefore to the claims herein for interpreting the scope of the invention.

DETAILED DESCRIPTION OF THE PREFERRED EMBODIMENT

Figures 1, 2, 3:
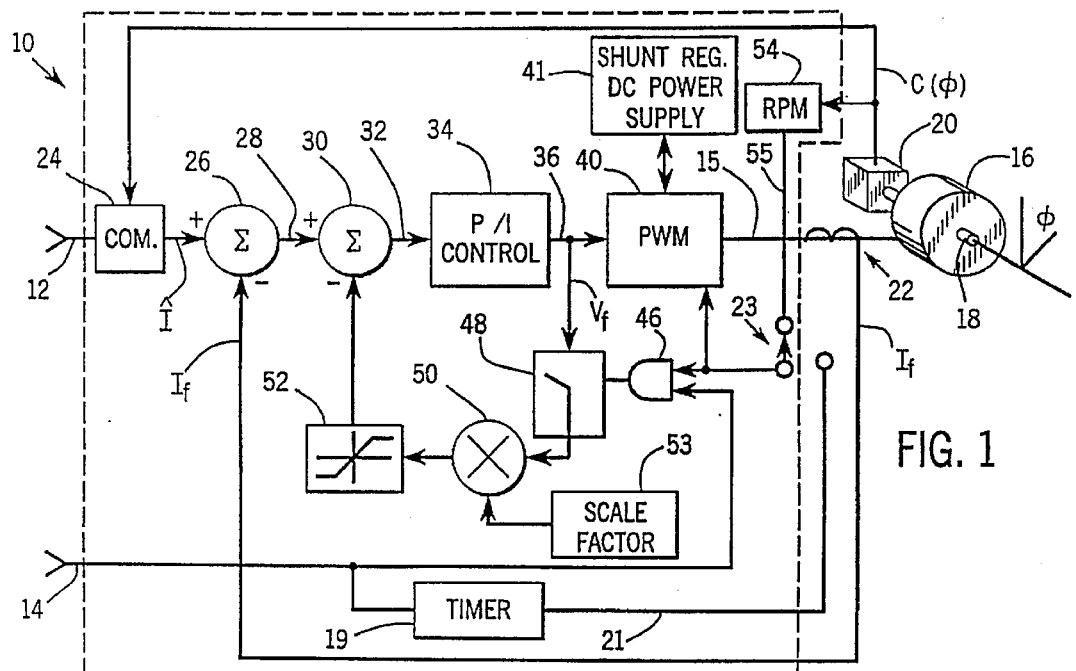
FIG. 1 is a schematic block diagram of a motor controller of the present invention showing current feedback for torque control of a brushless DC motor and voltage feedback for braking of the motor.
FIG. 2 is a graph showing motor RPM and motor current as a function of time after an emergency stop signal has been received in a system which simply disconnects the motor from the source of power.
FIG. 3 is a figure similar to FIG. 2 showing the RPM and motor current of the present invention in which a braking signal is developed by the back EMF of the motor.

Referring to FIG. 1, a motor controller 10 receives a torque command signal 12 and an emergency stop signal 14 and provides electrical power on two or more conductors 15 to internal stator windings (not shown), of a brushless DC motor 16. The motor 16 has a rotating shaft 18 connected to its internal rotor (not shown) and to a shaft encoder 20 which provides a commutating signal $C(\phi)$ indicating the angular position of the shaft $\phi$. The controller also receives a source of DC power 41 used to power the control circuitry and the PWM inverter 40.

A current sensor 22 measures current through conductors 15 received from the motor controller 10 by the motor 16 to provide a current feedback signal $I_f$. Generally there will be multiple values of $I_f$, one for each set of stator windings, for simplicity however, only one such signal is shown. Thus, FIG. 1 may be thought of as representing circuitry for one phase of the motor 16, (to be duplicated for other phases) or circuitry for a single phase motor.

Torque Control Circuitry

During normal operation of the motor controller 10, the emergency stop signal 14 is not present and a positive torque command signal 12 is applied to commutating circuitry 24. Commutating circuitry 24 converts the torque command signal 12 to a current command signal $\hat{I}$ which has an amplitude controlled by the torque command signal 12 and a phase controlled by the commutating signal $C(\phi)$ also received by the commutating circuitry 24, and as is generally understood in the art.

The current command signal $\hat{I}$ is next received by the non-inverting input of a first summing junction 26 which subtracts from $\hat{I}$, the value of the current feedback $I_f$ (received by inverting input of the summing junction 26) to produce an error signal 28 generally indicating the difference between the torque produced by the motor 16 and the desired torque indicated by torque command signal 12.

Error signal 28 is next received by the non-inverting input of a second summing junction 30 which, during normal operation in which an emergency stop signal 14 is not present, passes the error signal 28 to its output without change to produce a second error signal 32 also indicating the difference between desired and actual torque.

The second error signal 32 is received by a proportional/integral controller 34 such as is well known in the art. The proportional/integral controller 34 receives the error signal 32 and provides it both to an internal proportional amplifier and an internal integrating amplifier (neither shown). As is known in the art, the proportional amplifier scales the error signal by a gain factor to produce a proportional signal and the integrating amplifier scales the error signal by a second factor and performs a time integration of the error signal to produce an integrated signal. The proportional and integral signals are added together to produce a control signal 36 output from the proportional/integral controller 34 and indicating a desired voltage to be provided to the motor 16.

The control signal 36 is received by a pulse width modulating inverter 40 such as are well known in the art and which, by the rapid switching of solid state devices arranged in a bridge configuration, produces a high powered signal corresponding to control signal 36 at the conductors 15 and thus to the motor 16.

Thus, as the torque command signal 12 changes, a change in the error signals 28 and 32 is developed which is reflected in the control signal 36 of the proportional/integral controller 34 adjusting the voltage on the motor 16 provided by the PWM inverter 40 so as to adjust the torque produced by the motor 16.

If it is desired to stop the motor 16, it would be known in the art that the torque command signal 12 which is presented to the controller 12 would be reduced to zero, resulting in a value of zero for $\hat{I}$ as well. In this case the P/I controller 34 will attempt to control the PWM inverter 40 to bring the current feedback signal $I_f$ to zero thereby reducing the error signals to 28 and 32. As motor 16 coasts, it produces a back EMF (in the form of an alternating voltage at the terminals of the motor) caused by the changing magnetic field of the rotor cutting across the windings of the stator in the manner of a conventional electrical generator. The motor controller 10, in order to reduce the value of $I_f$ to zero, provides an alternating voltage exactly countering the back EMF thereby preventing current flow between the motor 16 and the PWM inverter 40 as if the motor 16 was disconnected from the PWM inverter 40.

Referring now also to FIG. 2, the values of $I_f$ and the RPM 42 of the motor 16 are shown plotted against time, where prior to an instant 44 the RPM 42 is a constant positive value and where the torque command signal 12 is reduced to zero at instant 44. As depicted, current $I_f$ drops to zero almost immediately but the RPM decays only slowly as caused largely by friction and eddy current losses within the motor 16. Although the motor 16 generates electricity as it coasts, the electrical power is not dissipated because no current can flow and thus no power is electrically transferred from the motor 16 to the motor controller 10.

Braking Circuitry

Referring again to FIG. 1, braking in the present invention employs a voltage feedback signal $V_f$ indicating the terminal voltage of the motor 16. Although this signal may be taken directly on the terminal of the motor 16, preferably it is taken at the input of the PWM inverter 40 to remove noise introduced by the PWM inverter 40 and to allow implementation of the present invention through software without additional wiring. While the feedback loop of $I_f$ is connected, the input of a PWM inverter 40 will equal the back EMF of the voltage since the feedback loop in controlling the feedback current to be zero provides a terminal voltage to the motor 16 exactly equalling and opposing the back EMF of the motor 16, as described above.

Generally, the back EMF represented by the voltage feedback $V_f$ is fed back to the input of proportional/integral controller 34 to cancel a portion of the current feedback $I_f$ which otherwise allows no current to flow between the motor 16 and the motor controller 10. The voltage feedback $V_f$ in allowing some current to flow between the PWM inverter 40 and the motor 16 allows energy to be extracted from the motor 16 and returned regeneratively to the power supply 14 of the pulse width modulator 40, typically storage capacitors. Excess energy is dissipated by the power supply regulator. By control of the amount of voltage feedback, $V_f$ the rate of motor braking can be controlled and importantly the amount of current flow can be maintained below potentially damaging amounts.

The braking of the present invention is initiated when the emergency stop signal 14 is applied to the motor controller 10. Provision must be made to set the torque command signal 12 to zero when the emergency stop signal 14 is present.

The emergency stop signal 14 is received by one input of an AND gate 46. The second input of the AND gate 46 receives either: (1) an RPM signal 55 indicating that the RPM of the motor 16 is above a predefined limit, as will be described below, or (2) a timer signal 21 of a timer 19 which remains high for a predetermined period of time after the emergency stop signal 14 is received. The particular input to the AND gate 46 is selected by a switch 23. The predetermined period of time indicated by the timer 19 is that which might be expected to allow the motor 16 to drop in RPM below the predefined limit. Thus, both signals 55 and 21 serve a similar purpose.

It will be assumed for the moment that either the RPM signal 55 and/or the timer signal is high (whichever is connected by switch 23 to AND gate 46) as will normally be the case when an emergency stop signal 14 is received. In this case, when the emergency stop signal 14 is received, the output of the AND gate 46 becomes high. The output of the AND gate 46 is connected to a switch 48 and when high, closes the switch 48. One side of the switch 48 is connected to the voltage feedback signal $V_f$ and the other side of the switch 48 is connected to a scaler 50.

The scaler 50 decreases the feedback voltage $V_f$ by a predetermined scale factor 53 and transmits it, thus scaled, to a limiter 52. Generally, the more $V_f$ is reduced by the scale factor 53, the less the braking action will occur.

The limiter 52 limits the absolute value of the scaled feedback signal and provides the same to the inverting input of the summing junction 30. The limiter 52 thus controls the extent to which the voltage feedback signal $V_f$ may reduce the current feedback signal $I_f$ permitting current to flow between the PWM inverter 40 and the motor 16. Accordingly, the limiter 52 limits how much current flow can occur and may be set to protect the circuitry of the PWM inverter 40 from excess current.

The signal output of the limiter 52, by preventing the current feedback from perfectly setting $I_f$ to zero, permits current flow between the motor 16 and the PWM inverter 40 that may dissipate energy from the motor 16.

Referring now to FIG. 3, the same motor used in the example of FIG. 2 is stopped using the above described braking system. At instant 44', an emergency stop signal 14 is provided to a motor controller 10. In this case, the current feedback $I_f$ remains above zero allowing energy to be dissipated through current conduction. Accordingly, the RPM value 42' drops much faster. At instant 47, the bridge of the PWM inverter 40 is opened reflecting the fact that further current induced braking is inefficient beyond this point and the desire to positively disconnect the motor 16 from the motor controller 10. Alternatively, the PWM inverter 40 may be disabled a fixed period of time after the receipt of the emergency stop signal 14.

Referring again to FIG. 1, the disabling of the bridge of the PWM inverter 40 may be triggered by the RPM signal 55 which goes low when the RPM of the motor 16 drops below a predetermined limit. The RPM signal 55 is produced by RPM monitor 54 which receives the encoder signal $C(\phi)$ to produce the RPM signal 55 according to methods well known in the art. The RPM signal 55 is in turn provided both to AND gate 46, as has previously been discussed, to trigger the braking voltage feedback and to the PWM inverter 40 to open the bridge. Alternatively other signals such as the alternating voltage of the voltage feedback signal $V_f$ may be used to deduce RPM through zero crossing detection or other similar methods.

If the AND gate 46 receives the timer signal 21, indicating that a predetermined time has elapsed after receipt of the stop signal 14, emergency this timer signal 21 is also provided to the PWM inverter 40 to open the bridge after this time period. This latter embodiment is less susceptible to failure in the shaft encoder 20.

Each of the described elements of the motor controller 10 may be realized by discrete electronic circuitry but preferably all elements except for the high powered PWM inverter 40 may be realized in software operating on an electronic computer wherein the torque command signal 12, the emergency stop signal 14 the position signal $C(\phi)$ and the current feedback signal $I_f$ are converted into digital words for computer processing by one or more A/D convertors (not shown) and the control signal 36 is converted from a digital word to a voltage to be input to the PWM inverter 40 by an D/A convertor.

The above description has been that of a preferred embodiment of the present invention. It will occur to those that practice the art that many modifications may be made without departing from the spirit and scope of the invention. In order to apprise the public of the various embodiments that may fall within the scope of the invention, the following claims are made.

I claim:

1. In a motor controller for operating a brushless DC motor in which the motor controller is connected to receive a torque command signal and a stop signal, in which the motor controller produces a current command signal based on the torque command signal, and in which the motor controller includes a motor voltage generation circuit for providing a drive voltage across terminals of the brushless DC motor, the motor voltage generation circuit including an input connected to a first current error signal developed as a difference between the current command signal and a current feedback signal, the method for operating the motor controller to provide braking of the brushless DC motor in response to a reduction of the torque command signal to zero and activation of the stop signal comprising the steps of:

(a) detecting activation of the stop signal;
   (b) producing a voltage feedback signal which is proportional to the back EMF of the motor;
   (c) responding to the activation of the stop signal by modifying the first current error signal as a function of the voltage feedback signal to produce a second current error signal; and
   (d) applying the second current error signal to the input of the motor voltage generation circuit instead of applying the first current error signal to the motor voltage generation circuit when the stop signal is activated to thereby permit current to flow between the motor controller and the brashless DC motor and enhance braking of the brushless DC motor by dissipating motor energy in the motor controller.

2. The method of claims 1 wherein the second current error signal of step (c) is produced by subtracting the voltage feedback signal from the first current error signal.

3. The improved method of claim 1 wherein the second current error signal of step (c) is produced by performing the substeps of:

(c1) scaling the voltage feedback signal by a predetermined factor to produce a scaled voltage feedback signal; and (c2) limiting the scaled voltage feedback signal to within a predetermined range;

wherein the current flow between the motor controller and the brushless DC motor during braking is thereby limited to a maximum current value.

4. The improved method of claim 1 including the step of:

(e) sensing a speed of the brushless DC motor during braking of the brushless DC motor in step (d); and (f) opening the circuit between the brushless DC motor and the motor controller when the speed of the brushless DC motor has dropped below a predetermined minimum speed.

5. The improved method of claim 4 wherein step (e) includes the step of determining the speed of rotation of the brushless DC motor from the back EMF.

6. The improved method of claim 1 including the step of:

(e) beginning a timer when the braking in step (d) is begun to measure a predetermined elapsed time; and (f) opening the circuit between the brushless DC motor and the motor controller when the timer in step (e) indicates expiration of the predetermined elapsed time.

7. A motor controller for controlling a brushless DC motor having terminals across which terminal voltage may be applied and through which a terminal current may pass, in which the motor controller receives a torque command signal and a stop signal, the motor controller comprising:

a current sensor connected to the brushless DC motor terminals for providing a current feedback signal indicating the terminal current;

a commutation circuit for producing a current command signal based on the received torque command signal;

a first summing junction for producing a first current error signal by taking a difference between the current feedback signal and the current command signal;

means for producing a voltage feedback signal representing the terminal voltage of the motor;

a voltage feedback switch connected to the stop signal for producing a switched voltage feedback signal, in which the switched voltage feedback signal is connected to the voltage feedback signal when the stop signal is in an activated state, and the switched voltage feedback signal is connected to a zero value when the stop signal is in a deactivated state;

a second summing junction for producing a second current error signal by taking the difference between the first current error signal and the switched voltage feedback signal;

a motor voltage generation circuit having an input connected to the second current error signal to provide the terminal voltage and terminal current to the motor; and wherein the motor controller is responsive to activation of the stop signal to modify the input to the motor voltage generation circuit to deviate from the first current error signal by an amount related to the voltage feedback signal to thereby permit current to flow between the motor controller and the brushless DC motor, enhancing braking of the brushless DC motor by dissipating motor energy in the motor controller.

8. The motor controller of claim 7 further comprising:

a speed monitoring circuit connected to the brushless DC motor for providing a speed signal indicating a speed of rotation of the brushless DC motor and in which the speed signal is connected to the voltage feedback switch, and in which the voltage feedback switch is operative to override the stop signal and reapply the zero value to the switched voltage feedback signal when the speed signal indicates that the speed of the brushless DC has dropped below a predetermined minimum speed.

9. The motor controller of claim 7 further comprising a timer having an input connected to the stop signal and providing an elapsed time output, wherein the timer is responsive to activation of the stop signal to begin timing of a predetermined time interval, wherein upon expiration of the predetermined time interval, the elapsed time output is activated, and wherein the elapsed time output is connected to the voltage feedback switch, and the voltage feedback switch is responsive to activation of the elapsed time output to override the stop signal and reapply the zero value to the switched voltage feedback signal.

10. The motor controller of claim 7 further comprising:

a scaler connected between the voltage feedback switch and the second summing junction for proportionately reducing a value of the switched voltage feedback signal by a predetermined ratio to thereby control the degree of braking applied when the stop signal is activated.

11. The motor controller of claim 7 further comprising:

a limiter connected between the voltage feedback switch and the second summing junction for limiting a value of the switched voltage feedback signal to within a predetermined range to control the maximum terminal current flowing between the motor controller and the brushless DC motor during braking.

\* \* \* \* \*